United States Patent Office 2,748,113
Patented May 29, 1956

2,748,113

POLYMETHYLENEIMINOALKANOLS

Frederick F. Blicke, Ann Arbor, Mich., assignor to Regents of The University of Michigan, Ann Arbor, Mich., a corporation of Michigan No Drawing. Application April 17, 1953,
Serial No. 349,560

6 Claims. (Cl. 260—239)

This invention relates to polymethyleneiminoalkanols containing from six to eight carbon atoms in the ring, to lower-alkyl-substituted derivatives thereof, and to acid addition and quaternary ammonium salts thereof.

This application is a continuation-in-part of my prior-filed application Serial 182,125, filed August 29, 1950, now abandoned.

The basic alcohols herein described are generally mobile liquids, readily soluble in most organic solvents, but sparingly soluble in water. They readily form addition salts with acids, such as, for example, hydrochloric, hydrobromic, nitric, sulfuric, acetic, lactic, picric, formic, tartaric, et cetera, and quaternary ammonium salts with appropriate compounds, such as, for example, methyl iodide, propyl bromide, dimethyl sulfate, ethyl bromide, et cetera. The acid addition salts are generally crystalline solids, soluble in water. The compounds of this invention are useful polymerization inhibitors and chain stoppers.

One method of preparing the compounds of the present invention is illustrated by the following example, which is not to be construed as limiting.

Example 1.—N-(beta-hydroxyethyl)-hexamethyleneimine

Hexamethyleneimine [77.5 grams (.782 mole)] was placed in a 500-milliliter flask equipped with a reflux condenser and a dropping funnel. The amine was heated on a steam bath and ethylene chlorohydrin [63.0 grams (.782 mole)] added dropwise over a period of one and one-half hours to the material maintained at a temperature of about 100 degrees centigrade. A crystalline mass formed which went back into solution. After heating on a steam bath overnight, the mixture was cooled and crystals obtained. Thirty-five grams of sodium hydroxide and sixty milliliters of water were added to the mixture and it was thereafter extracted with a 175-milliliter portion and three times with 45-milliliter portions of benzene. The extracts were combined and after drying over potassium carbonate, the benzene was distilled off at a pressure of about twenty millimeters of mercury absolute. There was thus obtained 71 grams (63.6 percent of the theoretical yield) of N-(beta-hydroxyethyl)-hexamethyleneimine, boiling at 114 degrees centigrade at 23 millimeters of mercury absolute, index of refraction $n_D^{26}$ 1.481.

The compounds of the present invention may be prepared by the reaction of a suitable halohydrin with a suitable polymethyleneimine. The reaction may be carried out with or without the use of an inert diluent, such as, for example, chloroform, methanol, benzene, or water. The inclusion in the reaction mixture of an acid binding agent, such as an excess of the amine, an alkali metal hydroxide, or other alkali or alkaline salt is preferred. The reaction is carried out by mixing the reactants together either in substantially equimolecular proportions or using an excess of the amine. In certain cases, the reaction is somewhat exothermic and the reagents are preferably mixed slowly with cooling and agitation, so as to maintain the temperature of the mixture at from about thirty degrees to about 120 degrees centigrade, depending upon, among other factors, the boiling point of any diluent included within the reaction mixture.

Further examples of the preparation of certain compounds within the scope of this invention are as follows, which examples are not to be construed as limiting.

Example 2.—N-(beta-hydroxyethyl)-4-methylhexamethyleneimine

In a manner similar to that of Example 1, 34.8 grams of 4-methylhexamethyleneimine and 26.6 grams of ethylene chlorohydrin were condensed to give a 61.3 percent yield of N-(beta-hydroxyethyl)-4-methylhexamethyleneimine, boiling at 102 to 103 degrees centigrade at ten millimeters of mercury absolute. 2.5 grams of the unreacted imine were recovered, indicating a 66.1 percent conversion.

Example 3.—N - (beta - hydroxyethyl) - 2 - methylhexamethyleneimine

In a manner similar to that of Example 1, 2-methylhexamethyleneimine [56.6 grams (.5 mole)] and 44.3 grams (.55 mole) of ethylene chlorohydrin were reacted to give a 51 percent yield of N-(beta-hydroxyethyl)-2-methylhexamethyleneimine, boiling at 123 degrees centigrade at 32 millimeters of mercury absolute.

Example 4.—N - (gamma - hydroxypropyl) - 2 - methylhexamethyleneimine

In a manner similar to that of Example 1, 31.2 grams (.33 mole) of propylene chlorohydrin and 35.2 grams (.308 mole) of 2-methylhexamethyleneimine were reacted in the presence of sodium hydroxide to yield 35.8 percent of N-(gamma-hydroxypropyl)-2-methylhexamethyleneimine, boiling between 130 and 140 degrees centigrade at sixteen millimeters of mercury, which, after purification, boiled at 134–135 degrees centigrade at sixteen millimeters of mercury absolute.

Example 5.—N - (beta - hydroxyethyl) - 2 - isopropyl-5 - methylhexamethyleneimine In a manner similar to that of Example 1, ethylene chlorohydrin [8.05 grams (0.1 mole)] was reacted with 15.5 grams (0.1 mole) of 2-isopropyl-5-methylhexamethyleneimine to yield 10.1 grams (52 percent of the theoretical yield) of N-(beta-hydroxyethyl)-2-isopropyl-5-methylhexamethyleneimine, boiling at 85–87 degrees centigrade at a pressure of two millimeters of mercury absolute.

Example 6.—N - (beta - methyl - beta - hydroxyethyl)-octamethyleneimine

Octamethyleneimine [10.5 grams (0.083 mole)], 12.0 grams (0.11 mole) of anhydrous sodium carbonate, 100 milliliters of benzene and 25 milliliters of methyl alcohol were placed in a 300-milliliter, three-necked flask, to which a condenser, a stirrer and a dropping funnel were attached, stirred and 10.0 grams (0.086 mole) of propylene bromohydrin added slowly. The mixture was stirred, refluxed for twelve hours, cooled in an ice bath, 100 milliliters of water added, and the contents of the flask poured into a one-liter beaker. The mixture was acidified with concentrated hydrochloric acid, the organic layer separated, the acidic solution made alkaline and extracted with three thirty-milliliter portions of ether. The ether extracts were dried over anhydrous sodium sulfate and distilled to yield 7.1 grams (47 percent of the theoretical yield) of N-(beta-methyl-beta-hydroxyethyl)-octamethyleneimine, boiling at 127–129 degrees centigrade at fifteen millimeters of mercury absolute; $n_D^{20}$ 1.4800.

The picrate salt formed in ether solution as hereinafter described, melted at 137–138 degrees centigrade after recrystallization from a mixture of methyl ethyl ketone and ether.

Analysis:
Calculated for $C_{17}H_{26}O_8N_4$: C, 49.27; H, 6.33; N, 13.52.
Found:                                49.26;    6.95;    13.80.

*Example 7.—N-(gamma-hydroxypropyl)-octamethyleneimine*

Octamethyleneimine [6.4 grams (0.05 mole)], 7.8 grams (0.075 mole) of anhydrous sodium carbonate, 100 milliliters of benzene and 25 milliliters of methyl alcohol were treated in a manner similar to that of Example 6 to yield 5.3 grams (58 percent of the theoretical yield) of N-(gamma-hydroxypropyl)-octamethyleneimine, boiling at 144–148 degrees centigrade at fifteen millimeters of mercury absolute; $n_D^{20}$, 1.4880.

The picrate salt formed in ether solution melted at 88–89 degrees centigrade after recrystallization from methyl ethyl ketone-ether.

Analysis:
Calculated for $C_{17}H_{26}O_8N_4$: C, 49.27; H, 6.33; N, 13.52.
Found:                                49.51;    6.61;    13.47.

*Example 8.—N-(beta-hydroxyethyl)-octamethyleneimine*

Octamethyleneimine [18.2 grams (0.14 mole)], 18.2 grams (0.17 mole) of sodium carbonate, 200 milliliters of benzene and fifty milliliters of methyl alcohol were treated in a manner similar to that of Example 6, to yield 18.7 grams (72 percent of the theoretical yield) of N-(beta - hydroxyethyl) - octamethyleneimine, boiling at 112–116 degrees centigrade at nine millimeters of mercury absolute; $n_D^{20}$ 1.4860.

The hydrochloride melted at 83–84 degrees centigrade after recrystallization from methyl ethyl ketone.

Analysis:
Calculated for $C_{10}H_{22}ONCl$: N, 6.75; Cl, 17.11.
Found:                              6.78;     17.01.

*Example 9.—N-(beta-methyl-beta-hydroxyethyl)-heptamethyleneimine*

Heptamethyleneimine [45.2 grams (0.4 mole)] and fifty milliliters of benzene were placed in a 200-milliliter, three-necked flask, to which a condenser, stirrer and a dropping funnel were attached, stirred, and 27.8 grams (0.2 mole) of propylene bromohydrin added. The mixture was stirred, refluxed for two hours, cooled in an ice-bath, and ten grams of sodium hydroxide dissolved in 100 milliliters of water added. The organic layer was separated and the aqueous portion extracted with two fifty-milliliter portions of ether. The organic layer and ether extracts were combined, dried over anhydrous magnesium sulfate and distilled, yielding 28.7 grams (84 percent of the theoretical yield) of N-(beta-methyl-beta-hydroxyethyl)-heptamethyleneimine, boiling at 109–112 degrees centigrade at eleven millimeters of mercury absolute; $n_D^{20}$ 1.4743.

The hydrochloride melted at 110–111 degrees centigrade after recrystallization from ethyl alcohol-ether.

Analysis:
Calculated for $C_{10}H_{22}ONCl$: N, 6.75; Cl, 17.11.
Found:                              6.73;     17.15.

*Example 10.—N-(gamma-hydroxypropyl)-heptamethyleneimine*

Heptamethyleneimine [18.5 grams (0.16 mole)], 100 milliliters of benzene and 11.4 grams (0.08 mole) of trimethylene bromohydrin were treated in a manner similar to Example 9 to yield 11.1 grams (79 percent of the theoretical yield) of N-(gamma-hydroxypropyl)-heptamethyleneimine, boiling at 121–124 degrees centigrade at nine millimeters of mercury absolute; $n_D^{20}$ 1.4847.

The hydrochloride melted at 102–103 degrees centigrade after recrystallization from acetone-ether.

Analysis:
Calculated for $C_{10}H_{22}ONCl$: N, 6.75; Cl, 17.11.
Found:                              6.71;     17.04.

*Example 11.—N-(beta-hydroxyethyl)-heptamethyleneimine*

Heptamethyleneimine [28 grams (0.25 mole)] and 15.6 grams (0.125 mole) of ethylene bromohydrin, were treated in a manner similar to that of Example 9 to yield 17.1 grams (87 percent of the theoretical yield) of N-(beta - hydroxyethyl) - heptamethyleneimine, boiling at 109–112 degrees centigrade at fourteen millimeters of mercury absolute; $n_D^{20}$ 1.4829.

The hydrochloride melted at 76–77 degrees centigrade after recrystallization from ethyl alcohol-ether.

Analysis:
Calculated for $C_9H_{20}ONCl$: N, 7.23; Cl, 18.34.
Found:                           7.24;     18.22.

*Example 12.—N-(beta-methyl-beta-hydroxyethyl)-hexamethyleneimine*

Hexamethyleneimine [65.0 grams (0.66 mole)] was placed in a 200-milliliter, three-necked flask, to which a condenser, a stirrer and a dropping funnel were attached, stirred and 31.5 grams (0.33 mole) of propylene chlorohydrin was added slowly. The mixture was stirred, heated for four hours on a steam bath, cooled in an ice-bath and 18 grams of sodium hydroxide, dissolved in 150 milliliters of water, was added. The organic layer was separated and the aqueous portion extracted with two fifty-milliliter portions of ether. The organic layer and ether extracted were combined, dried over anhydrous magnesium sulfate and distilled, yielding 32.5 grams (63 percent of the theoretical yield) of N-(beta-methyl-beta-hydroxyethyl) hexamethyleneimine, boiling at 97–100 degrees centigrade at eleven millimeters of mercury absolute; $n_D^{20}$ 1.4680.

The hydrochloride melted at 131–132 degrees centigrade after recrystallization from isopropyl alcohol-ether.

Analysis:
Calculated for $C_9H_{20}ONCl$: N, 7.23; Cl, 18.34.
Found:                           7.19;     18.31.

*Example 13.—N-(gamma-hydroxypropyl)-hexamethyleneimine*

Hexamethyleneimine [39.6 grams (0.4 mole)] and 18.9 grams (0.2 mole) to trimethylene chlorohydrin were treated in a manner similar to that of Example 12 to yield 28 grams (89 percent of the theoretical yield) of N-(gamma - hydroxypropyl) - hexamethyleneimine, boiling at 112–114 degrees centigrade at nine millimeters of mercury absolute; $n_D^{20}$ 1.4825.

The hydrochloride melted at 153–154 degrees centigrade after recrystallization from isopropyl alcohol-ether.

Analysis:
Calculated for $C_9H_{20}ONCl$: N, 7.23; Cl, 18.34.
Found:                           7.31;     18.22.

*Example 14.—N-(beta-methyl-beta-hydroxyethyl)-2-methylhexamethyleneimine*

2-methylhexamethyleneimine [11.3 grams (0.1 mole)] and 13.9 grams (0.1 mole) of propylene bromohydrin were treated in a manner similar to that of Example 12 to yield ten grams (59 percent of the theoretical yield) of N - (beta - methyl - beta - hydroxyethyl) - 2 - methylhexamethyleneimine, boiling at 96–98 degrees centigrade at seven millimeters of mercury absolute; $n_D^{20}$ 1.4670.

The methiodide, obtained from an ethereal solution of the free base and methyl iodide, melted at 180–181 degrees centigrade after recrystallization from methyl ethyl ketone.

Analysis:
Calculated for $C_{11}H_{24}ONI$: N, 4.47; I, 40.52.
Found:  4.49;  40.44.

*Example 15.—N-(beta-methyl-beta-hydroxyethyl)-4-methylhexamethyleneimine*

4-methylhexamethyleneimine [11.3 grams (0.1 mole)] and 13.9 grams (0.1 mole) of propylene bromohydrin were treated in a manner similar to that of Example 12 to yield 12.1 grams (71 percent of the theoretical yield) of N-(beta-methyl-beta-hydroxyethyl)-4-methylhexamethyleneimine, boiling at 101–104 degrees centigrade at twelve millimeters of mercury absolute; $n_D^{20}$ 1.4643.

The hydrochloride melted at 105–106 degrees centigrade after recrystallization from isopropyl alcohol-ether.

Analysis:
Calculated for $C_{10}H_{22}ONCl$: N, 6.75; Cl, 17.11.
Found:  6.83;  17.08.

*Example 16.—N-(gamma-hydroxypropyl)-4-methylhexamethyleneimine*

4-methylhexamethyleneimine [11.3 grams (0.1 mole)] and 13.9 grams (0.1 mole) of trimethylene bromohydrin were treated in a manner similar to that of Example 12 to yield 11.3 grams (66 percent of the theoretical yield) of N-(gamma-hydroxypropyl)-4-methylhexamethyleneimine, boiling at 123–127 degrees centigrade at twelve millimeters of mercury absolute; $n_D^{20}$ 1.4780.

The hydrochloride melted at 115–116 degrees centigrade after recrystallization from isopropyl alcohol-ether.

Analysis:
Calculated for $C_{10}H_{22}ONCl$: N, 6.75; Cl, 17.11.
Found:  6.69;  17.22.

"Halohydrin," as used in this specification and the appended claims, is meant to include halo-substituted lower-alkanols, wherein the halogen is selected from the group consisting of chlorine, bromine and iodine. Representative halohydrins within the scope of this invention include, for example, ethylene chlorohydrin, trimethylene chlorohydrin, butylene chlorohydrin, amylene chlorohydrin, ethylene iodohydrin, hexylene chlorohydrin, heptylene chlorohydrin, et cetera. "Lower-alkyl," as used in this specification and the appended claims, is intended to include those alkyl radicals containing up to and including eight carbon atoms, such as, for example, methyl-, ethyl-, propyl-, isobutyl-, secondary butyl-, tertiary butyl-, amyl-, hexyl-, heptyl-, et cetera.

Acid addition and quaternary ammonium salts of the compounds above-described may be prepared by reacting in the presence of a suitable solvent, for example, ether, equimolecular quantities of the iminoalkanol with a suitable acid or quaternarizing compound, and separating the resulting salt from the reaction mixture in conventional manner.

The following example is not to be construed as limiting.

*Example 17.—N-(beta-hydroxyethyl)-hexamethyleneimine acetate*

Approximately ten grams of N-(beta-hydroxyethyl)-hexamethyleneimine was dissolved in sixty grams of ether, and 4.4 grams of acetic acid added thereto. The mixture was dried over anhydrous magnesium sulfate, and the ether removed. There was thus obtained N-(beta-hydroxyethyl)-hexamethyleneimine acetate, as a crystalline material.

Certain of the compounds which serve as intermediates for the preparation of the compounds are unknown in the art. The following preparations illustrate one method which may be employed to prepare certain of the intermediates which can be used to prepare the compounds of the present invention.

PREPARATION 1.—4-METHYLHEXAMETHYLENEIMINE

A mixture of 23.2 grams (.61 mole) of lithium aluminum hydride in 400 milliliters of ether was placed in a one-liter, round-bottom, three-necked flask equipped with a stirrer, a dropping funnel and a condenser. The mixture was refluxed until almost complete solution was obtained and thereafter 77.5 grams (.61 mole) of 4-methylhexamethyleneimine-2-one dissolved in 150 milliliters of ether added thereto at a rate such that gentle refluxing occurred, which took about two hours. The mixture was thereafter refluxed for two hours with external heating, and cooled in an ice-bath. Fifty-eight milliliters of water was added slowly to the reaction mixture and it was thereafter steam distilled. The distillate was salted out with sodium chloride, separated from the aqueous residue, and the aqueous residue extracted with ether. The ether extracts were added to the organic layer, the solution dried over potassium carbonate, and the ether removed therefrom. The mixture was thereafter distilled to give a 75–80 percent yield of 4-methylhexamethyleneimine, boiling at 155–156 degrees centigrade at 745 millimeters of mercury absolute.

PREPARATION 2.—2-METHYLHEXAMETHYLENEIMINE 128.9 grams (1.0 mole) of 7-methylhexamethyleneimine-2-one and 800 milliliters of ether were contacted with 47.42 grams (1.25 mole) of lithium aluminum hydride in 1200 milliliters of ether and refluxed for two hours to yield 67 grams of 2-methylhexamethyleneimine, boiling at 148–150 degrees centigrade.

PREPARATION 3.—2-ISOPROPYL-5-METHYLHEXAMETHYLENEIMINE 42.5 grams of 7-isopropyl-4-methylhexamethyleneimine-2-one was contacted with twenty grams of lithium aluminum hydride in a manner similar to that of preparation 1 to give an 83.4 percent yield of 2-isopropyl-5-methylhexamethyleneimine, boiling at 83.5–84.5 degrees centigrade at a pressure of fifteen millimeters of mercury absolute.

Various modifications may be made in the compounds and process of the present invention without departing from the spirit or scope thereof and it is to be understood that I limit myself only as defined in the appended claims.

I claim:

1. A polymethyleneiminoalkanol selected from the group consisting of (*a*) those having the formula:

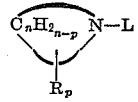

wherein $n$ is an integer from 6 to 8, inclusive, $p$ is an integer from zero to 2, inclusive, L is lower-alkyl-ol and R is lower-alkyl and (*b*) acid addition and quaternary ammonium salts thereof.

2. N-(beta-hydroxyethyl)-hexamethyleneimine.
3. N-(gamma-hydroxypropyl)-octamethyleneimine.
4. N-(beta-hydroxyethyl)-octamethyleneimine.
5. N-(gamma-hydroxypropyl)-heptamethyleneimine.
6. N-(beta-hydroxyethyl)-heptamethyleneimine.

References Cited in the file of this patent

UNITED STATES PATENTS 2,475,068  Wilson _____ July 5, 1949

OTHER REFERENCES

Tokura et al.: Chem. Abst., vol. 43, p. 2176 (1949).
Basileiados: Chem. Abst., vol. 32, col. 167 (1938).